United States Patent [19]

Maki et al.

[11] Patent Number: 4,791,585
[45] Date of Patent: Dec. 13, 1988

[54] CRYOGENIC THERMOMETER EMPLOYING MOLECULAR LUMINESCENCE

[75] Inventors: August H. Maki, Davis; Mohammad-Reza Taherian, San Carlos, both of Calif.

[73] Assignee: The Regents of the University of California, Berkeley, Calif.

[21] Appl. No.: 706,331

[22] Filed: Feb. 27, 1985

[51] Int. Cl.⁴ .......................... G01J 5/00; G01K 11/00
[52] U.S. Cl. .................................... 364/557; 374/159; 356/43
[58] Field of Search .................... 374/137, 159, 139; 364/557; 62/437; 73/25, 26, 27 A; 356/44, 45, 43

[56] References Cited

U.S. PATENT DOCUMENTS

| | | | |
|---|---|---|---|
| 4,057,349 | 11/1977 | Barrett | 356/45 |
| 4,075,493 | 2/1978 | Wickersheim | 250/461 R |
| 4,215,275 | 7/1980 | Wickersheim | 250/459 |
| 4,340,405 | 6/1982 | Steyert, Jr. et al. | 62/437 |
| 4,437,772 | 3/1984 | Samulski | 356/44 |
| 4,448,547 | 5/1984 | Wickersheim | 374/137 |
| 4,560,286 | 12/1985 | Wickersheim | 374/159 |

OTHER PUBLICATIONS

Chemical Physics, 32 (1978) 369-380, "Optically Detected Magnetic Resonance Study of the Lowest Excited Triplet State of Aromatic Thioketones: Xanthione", August H. Maki et al.
Chemical Physics Letters, Mar. 15, 1980, vol. 70, No. 3, 508–512, "An Unusually Large Zero-Field Splitting in the Molecule Xanthione", D. M. Burland.
Chemical Physics, 68 (1982) 179–189, "Optically Resolved Zero Field Splittings in the Phosphorescence Spectra of Aromatic Thioketones", Taherian et al.
Journal of Chemical Physics, 78(12), Jun. 15, 1983, 7099–7107, "Electron Spin-Lattice Relaxation in the Phosphorescent State of Xanthione", Taherian et al.
Chemical Physics Letters, Apr. 22, 1983, vol. 96, No. 5, 541–546, "The Phosphorescent State of -Thiopyrones: Optically-Resolved Zero-Field Splittings", Taherian et al.

Primary Examiner—Errol A. Krass
Assistant Examiner—Brian M. Mattson
Attorney, Agent, or Firm—Phillips, Moore, Lempio & Finley

[57] ABSTRACT

A cryogenic thermometer using molecular luminescence determines temperature. A sensor material is used which is capable of emitting radiant energy from a spin multiplet when excited, the excited state being characterized by a large zero field splitting (ZFS), and in which two of the sublevels split by the ZFS are radiative in the visible or near infrared region and are optically resolvable from each other. Spin-lattice relaxation rates between the sublevels are much larger than the sublevel decay rates to other states in order that their populations remain close to thermal equilibrium during optical pumping. The relative intensity of the two bands of radiation is determined and the temperature calculated therefrom. Xanthione (XS) dissolved in n-hexane may be used as a sensor material in the optimum range of 3 to 10K, with estimated precision varying between 0.4 mK and 3.0 mK within this range. Other disclosed sensor materials should allow extension of the optimal range to about 20K on the high end and somewhat below 2K on the low end.

40 Claims, 1 Drawing Sheet

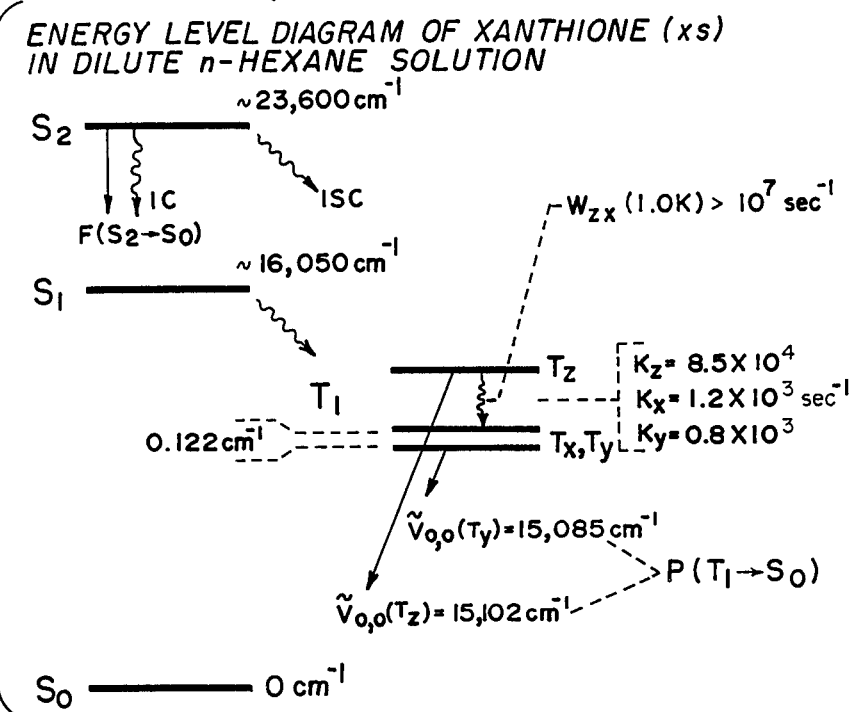
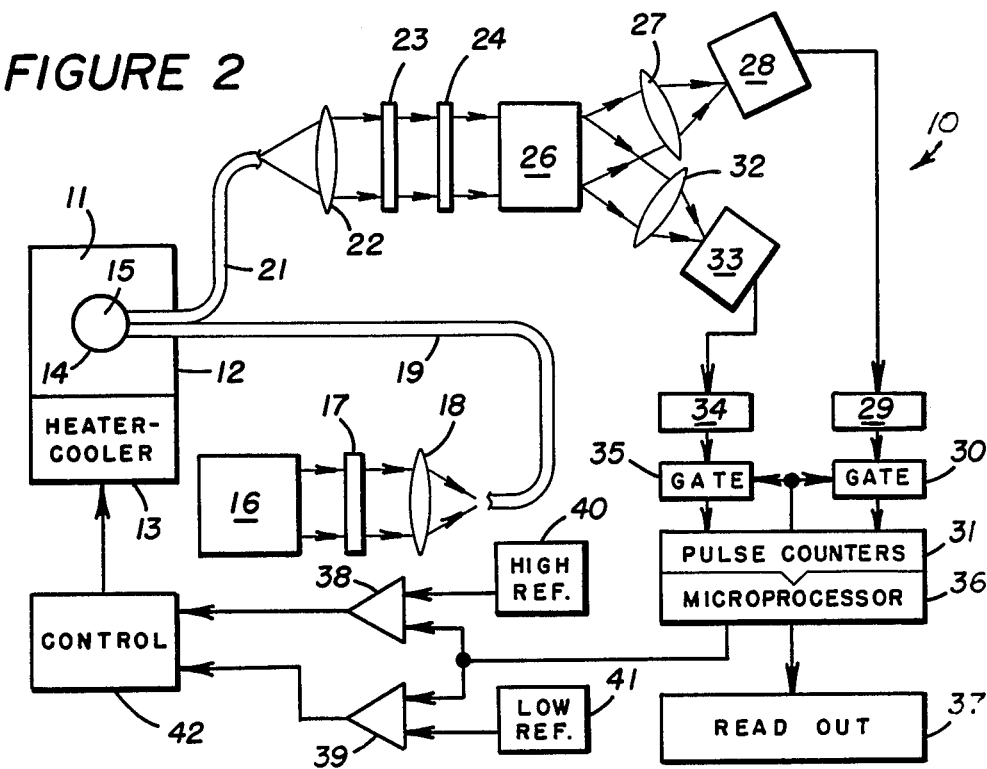

CRYOGENIC THERMOMETER EMPLOYING MOLECULAR LUMINESCENCE

This invention was made with Government support under Grant No. CHE 82-02765 awarded by the National Science Foundation. The Government has certain rights in this invention.

BACKGROUND OF THE INVENTION

The present invention relates to cryogenic thermometry and more particularly to the use of molecular luminescence in the determination of cryogenic temperatures.

Temperature measurement in the cryogenic region is presently done generally using either the measurement of the vapor pressure of liquid halium, or by means of a calibrated resistance as a sensor. In the helium method, the vapor pressure is measured and a conversion of the helium vapor pressure to its temperature is made using a suitable conversion table (F. G. Brickwedde, J. Res. NBS 64A, 1960). This system has a distinct advantage in that the temperature determination is based on thermodynamic properties of a pure sensor material, and thus a single calibration can be used for all individual sensors. On the other hand, the apparatuses involved for obtaining the vapor pressure measurements are cumbersome, and measurements are tedious. Further, the low critical temperature of helium limits these measurements to below 5.3K.

In the resistance method, as well-defined current is passed through a calibrated resistance (carbon glass, germanium, silicon diode) whose resistance varies with temperature. The voltage across the resistance is measured and is converted to sensor temperature by use of a calibration curve or table. The resistance method is considerably more convenient to use than the helium method and can be used throughout the liquid helium range as well as above 5.3 K. However, since no two sensors can be constructed alike, each resistance element must be calibrated individually, usually by comparison with a secondary standard whose calibration can be traced to primary temperature standards maintained at the National Bureau of Standards.

SUMMARY OF THE INVENTION

It is an object of the invention to provide a cryogenic thermometer having the advantages of the helium vapor pressure and resistance methods without their attendant disadvantages.

In more particular it is an object of the present invention to provide a cryogenic thermometer system wherein the temperature measurement is based on the photophysical and thermodynamic properties of a well-defined system, so that a single calibration can be used for individual sensors, wherein the temperature range is greater than that of the helium pressure method, and wherein the system is convenient to use and capable of rapid temperature determinations.

Additional objects, advantages and novel features of the invention will be set forth in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects and in accordance with the present invention, as embodied and broadly described herein, a method and apparatus for measuring the temperature of an environment which is at a cryogenic temperature is provided wherein a sensor material is placed in the environment, the sensor material being capable of emitting radiant energy from a spin multiplet when excited, the excited state of the spin multiplet being characterized by an energy splitting of the spin degeneracy in the absence of applied electric or magnetic fields (ZFS), and in which two of the sublevel states split by the ZFS are radiative in the visible or near infrared region with the emissions being optically resolvable from each other. The sensor material is excited, and the relative intensity of the two sublevel radiant emissions are used to calculate the temperature of the sensor material.

In another aspect of the invention, an environment in which the sensor is placed is maintained at a constant temperature by heating or cooling the environment as required to maintain the relative intensity of the two sublevel emissions of the sensor material at a constant value.

BRIEF DESCRIPTION OF THE DRAWINGS

The accompanying drawings which are incorporated in and form part of the specification, illustrate a preferred embodiment of the invention, and, together with the description serve to explain the principles of the invention.

FIG. 1 is an energy level diagram showing electronic energy levels of xanthione (XS) in a dilute n-hexane solution.

FIG. 2 is a block diagram of a molecular luminescence thermometer made in accordance with the present invention.

DETAILED DESCRIPTION OF THE INVENTION

The method and apparatus for temperature measurement and control is based on measuring the emissions from different spin components of molecules and will be described herein with reference to a particular compound, xanthione, XS, a thioketone whose luminescence properties in the cryogenic temperature range have been studied in some detail. Some of these studies have been described in the following published scientific literature: A. H. Maki, P. Svejda, and J. R. Huber (1978), "Optically detected magnetic resonance study of the lowest excited triplet state of aromatic thioketones: xanthione," *Chemical Physics* 32, 369–380; D. M. Burland (1980), "An unusually large zero field splitting in the molecule, xanthione," *Chemical Physics Letters* 70, 508–512; D. M. Burland (1981), "The spectroscopy of xanthione in xanthone: an example of spin-orbit coupling dominated zero field splitting," *Journal of Chemical Physics* 75, 2635–2642; M. -R. Taherian and A. H. Maki, (1982), "Optically resolved zero field splittings in the phosphorescence spectra of aromatic thioketones," *Chemical Physics* 68, 179–189; M. -R. Taherian and A. H. Maki (1983), "Electron spin-lattice relaxation in the phosphorescent state of xanthione," *Journal of Chemical Physics* 78, 7099–7107; and M. -R. Teherian and A. H. Maki (1983), "The phosphorescent state of γ-thiopyrones: optically-resolved zero-field splittings" *Chemical Physics Letters* 96, 541–546.

The compounds XS is a stable organic molecular solid at room temperature which may be stored in the dark for extended periods (years). It slowly undergoes photodegradation at elevated temperatures. Xanthione also has the following additional properties which are of importance in a sensor material for cryogenic temperature sensing:

(a) The sensor molecule emits energy radiations in the form of luminescence from a spin multiplet when optically pumped with visible or ultraviolet light of appropriate wavelength;

(b) The excited electronic state state from which the luminescence originates is characterized by an energy splitting of the spin degeneracy in the absence of applied static electric or magnetic fields which is large on the scale of optical emission bandwidths, such energy splittings being referred to as zero field splittings, ZFS, of the multiplet state;

(c) The compound may be dissolved in a host material which provides luminescence emission linewidths which are narrower than the ZFS in the cryogenic range of measurement;

(d) At least two of the sublevel states of the multiplet state split by the large ZFS are radiative in the visible or near infrared spectral region, and the corresponding emission bands for at least one vibronic transition have photon energies which differ by the corresponding ZFS, and these spectral bands do not have significant overlap with any other emission from the sample;

(e) Spin-lattice relaxation (SLR) rates between the two sublevel states referred to in (d) are very much larger than their decay rates to other energy levels, particularly to the ground electronic state.

All five of these properties, (a)–(e), are possessed by XS when a dilute solution ($10^{-4}-10^{-3}$M) in the solvent n-hexane is chilled to a temperature region in the vicinity of 4K.

The location of the low-lying electronic energy levels of XS in n-hexane, as well as some of the known kinetic parameters are shown in the energy level diagram, FIG. 1. This diagram shows the ground state $S_0$, the two excited singlet states, $S_1$ and $S_2$, the lowest triplet state, $T_1$, and their relative energies wave numbers ($cm^{-1}$). The observable luminescence emissions, (the fluorescence, $F(S_2 \rightarrow S_0)$, from the $S_2$ state and the phosphorescence, $P(T_1 \rightarrow S_0)$, from the $T_1$ state) are shown in solid lines and the radiationless processes (the internal conversions, IC, spin-lattice relaxation, SLR, and intersystem crossings, ISC) are indicated by wavy lines.

The triplet state, $T_1$, is of the most importance in the present invention. The published literature above confirms that the ZFS parameter, D, of the $T_1$ state for XS in n-hexane is in the order of $-16$ cm$^{-1}$, with the shortest lived and most radiative sublevel $T_z$ at 15,102 cm$^{-1}$, above a nearly degenerate sublevel pair $T_x$, $T_y$. The sublevel pair $T_x$, $T_y$ is not optically resolvable and the triplet sublevel $T_y$ is assumed herein to be the sublevel responsible for phosphorescence 0, 0-band emission at 15,085 cm$^{-1}$. It is irrelevant, however, if $T_x$ is responsible for this emission band. The published literature also confirms that the ZFS parameter, D, for XS in a single crystal xanthone host matrix is $-11$ cm$^{-1}$ and $-20$ cm$^{-1}$ for the two trap sites observed.

A rapid spin-lattice relaxation (SLR) has been confirmed directly for XS in n-hexane at 1.0K, with a selective pulsed laser excitation of the higher energy $T_z$ sublevel being followed by a monitoring of the phosphorescence emission from the lower energy $T_x$ and $T_y$ sublevels. The decay of the $T_z$ population to $T_x$ and $T_y$ was found to be complete within $10^{-7}$s, so that the rate constant, $W_{zx}$ of SLR from the $T_z$ sublevel to the $T_x, y$ sublevels is greater than $10^7$ sec$^{-1}$. The decay constants, $k_x$, $k_y$ and $k_z$, of the $T_1$ sublevels to the ground state are all much smaller than the $W_{zx}$ rate constant. As a consequence, with the highly efficient SLR mechanism, the $T_z$ and $T_y$ populations are maintained in internal thermal equilibrium at the ambient lattice temperature even in the presence of optical pumping and decay of the sublevels.

FIG. 2 illustrates a molecular luminescence system 10 for measuring the temperature of an environment 11 which is at an unknown cryogenic temperature or for maintaining the environment 11 at a constant cryogenic temperature. For purposes of illustration, the environment 11 is the interior of insulated chamber 12, and a heater-cooler 13 is provided to maintain the chamber interior at a cryogenic temperature. A temperature sensor 14 is disposed in the interior of chamber 12, sensor 14 having therein a sensor material 15, such as the previously described XS in n-hexane, the sensor material being exposed to and at the temperature of the cryogenic environment 11.

The sensor material 15 is continuously excited by a suitable excitation light source 16 whose output passes through filter 17 (to isolate the desired excitation band) and then through condensing lens 18 into the optical fiber 19 which leads to sensor 14.

Emission from the excited sensor material 15 is transmitted through optical fiber 21 to condensing lens 22 which collimates the light from the end of the fiber. The collimated light then passes through the band pass optical filter 23, which passes the 0,0-band of phosphorescence emission from the sensor material 15 to the next filter 24 and filters out frequencies beyond the range of filter 24. Filter 24 is preferably a double peaked polarizing interference filter, tuned to the frequencies of the $T_z$ and $T_y$ emissions from the sensor material and operable to polarize one of these emissions horizontally while polarizing the other emission vertically. The polarized emissions then pass through a suitable crystal 26, such as a birefringent calcite crystal, to spacially separate the two polarized emissions.

The separated $T_z$ emission is directed through condensing lens 27 to photomultiplier 28, and then to pulse amplifier and discriminator 29. The output of the pulse amplifier and discriminator is a series of pulses proportional in number to the number of photons emitted by the $T_z$ sublevel, and those pulses are fed through gate 30 to one of the channels of the dual channel pulse counter 31. Likewise, the separated $T_y$ emission is directed through lens 32 to photomultiplier 33, whose output goes to the pulse amplifier and discriminator 34. The output of this last unit is a series of pulses proportional to the number of photons emitted by the $T_y$ sublevel of the sensor material 15, and these pulses pass through gate 35 to the other channel of the dual channel pulse counter 31. The pulse counter 31 interfaces with microprocessor 36 and delivers the counts from each channel to the microprocessor as first and second signals which are proportional to the radiant intensity of the $T_z$ and $T_y$ sublevel states of the sensor material 15.

The microprocessor 36 controls gates 30 and 35 so that they are open for transmission of pulses for the same length of time. For example, both gates may be opened at the same time, with both being closed when the count in one channel reaches a predetermined number, e.g., when the count from the $T_y$ channel reaches $10^6$ or $10^7$, as desired. The ratio of the first and second signals provides a relative count of the emitted photons, and thus the relative intensity of emissions from the two sublevels $T_z$ and $T_y$.

The ratio of $T_z$ and $T_y$ emission may then be used by the microprocessor 36, as described below, to calculate the temperature of the sensor material 15, and thus the temperature of the environment 11. This calculated temperature may then be outputted to a suitable readout device 37.

The ratio of the first and second signals may also be applied to comparators 38 and 39 along with high and low reference signals 40 and 41. If the ratio of the first and second signal increases and exceeds the high reference signal, the comparator 38 will output a signal to control 42 which will actuate heater-cooler 13 to decrease the temperature in chamber 12. This in turn will cause the ratio of the first and second signals to decrease. Contrarily, if the ratio decreases beyond the low reference signal, comparator 39 will output a signal to control 42 which will cause the heater-cooler 13 to increase the temperature in chamber 12 so that the ratio of the first and second signals increases. As is apparent, this feedback arrangement enables the environment 11 to be maintained at a constant temperature by heating or cooling the environment as needed to maintain the ratio of $T_z$ and $T_y$ emissions at a constant value.

Photon counting is used in the present invention to obtain the highest possible precision in the collected emission intensities of the two sublevels, using moderate excitation energy to avoid thermal heating by the radiationless processes.

The microprocessor applies required corrections to the counts received, such as the photomultiplier dark counts, band overlap corrections, and then calculates the temperature in a manner as now described. Device calibration factors are stored in the microprocessor.

It is assumed that the sensor 14 is operated in a region of temperature where SLR rates of the sensor material 15 are very much larger then the sublevel decay rates so that the deviation of the sublevel populations from thermal equilibrium is not significant. This being the case, the equation which gives the relative populations of the sublevels is $$N_z/N_y = \exp[-E_{zy}/RT] \qquad [1]$$

wherein $N_z$ and $N_y$ are populations, $E_{zy}=E_z-E_y$ is the energy difference, R is the gas constant, and T is the absolute temperature. The number of photons detected in a given time interval t will be $$n_u = c_u N_u k_u^r t,$$

where u=z or y, $k_u^r$ is the radiative rate constant for emission of $T_u$ into the monitored band, and $c_u$ is an instrument constant which determines the collection efficiency of $T_u$ emission. The instrument constant will depend only on the apparatus, and not on the sample, provided that the sample is randomly oriented, i.e., polycrystalline, so that the relative intensities do not vary with sample orientation. The quantity $n_u$ represents the count in one of the counter channels of dual channel pulse counter 31 after correction. The ratio of the corrected counts in the two channels is $$n_z/n_y = (c_z k_z^r/c_y k_y^r)\exp[-E_{zy}/RT] = R_{zy}.$$

Taking logarithms gives the simple result, $$\ln R_{zy} = A - E_{zy}/RT, \qquad [2]$$

where $A=\ln(c_z k_z^r/c_y k_y^r)$ depends both on the radiative properties of the sample in the observed emission bands, and on the apparatus.

It is expected that for most apparatus, $c_z/c_y \sim 1$, and it has been estimated that $k_z^r/k_y^r > 10^2$ for XS emission in the 0,0-band. This makes $A \sim 5$ for XS with 0,0 band detection. However, this number is not presently known with sufficient accuracy for use, and it is best obtained from a calibration. The other quantity which must be obtained in order to use eq. [2] to obtain T is $E_{zy}$. From spectral observation, $E_{zy}$ can be estimated at $16\pm1$ cm$^{-1}$ for XS in n-hexane, with the uncertainty largely the result of the bandwidth. $E_{zy}$ may eventually be obtained spectroscopically with far greater accuracy, and would make this device closer to an ideal fundamental temperature standard. Without this, $E_{zy}$ is best obtained from a calibration.

Two parameters must be obtained for accurate thermometry, and thus calibration must be done at two temperatures, at least, in the optimal temperature range of the device. Possibilities are the superconducting transition temperatures of pure metals such as indium ($T_c=3.4145\pm0.0015$K) and lead ($T_c=7.1999\pm0.0025$K), and the normal boiling temperature of liquid helium ($T_b=4.214$K). Once A and $E_{zy}$ have been determined for the particular sensor and measuring device, calculation of T proceeds by evaluation of $$T=(E_{zy}/R)(A-\ln R_{zy})^{-1}, \qquad [3]$$

with the parameters $E_{zy}/R$ and A stored in the microprocessor.

The accuracy of eq. [3] depends upon several factors, the most important of which is the efficiency of SLR in the measurement range. This source of error is expected to be largest near the low temperature end of the effective range. Although $W_{zy}$ can be assumed to greatly exceed $10^7$ s$^{-1}$ at all temperatures, the reverse rate constant, $W_{yz}$, is thermally activated, and can become quite small at low temperature. It should be true that $$W_{yz} = W_{zy}\exp[-E_{zy}/RT].$$

Assuming that $W_{zy} \sim 10^8$ at T=3K, and using $E_{zy}=16$ cm$^{-1}$, it can be estimated that $W_{yz}=4.6\times10^4$ at this temperature. This rate constant is about 50-fold larger than $k_y$ (FIG. 1). Thus, decay of $T_y$ should not be a large source of error at this temperature.

In the higher temperature region, the emission bands undergo thermal broadening and their effective separation will be degraded. This problem will probably become significant near 20K for XS. It should not be a problem at 10K. At this T, $R_{zy}$ is about 10 for XS, while $R_{zy}$ is about 0.1 at 3K. This range, 3-10K, (3-10K) probably represents a reasonable optimal range for this sensor system. Precision, as determined by counting statistics, is excellent, provided that counts of $10^6$ to $10^7$ are accumulated in the $T_y$ channel.

Another source of systematic error which affects the accuracy (but not the precision to a large extent) is the presence of phonon sidebands to the red of the emission bands. The 0,0-bands are quite well resolved from the phonon sidebands under the highest resolution conditions so far used. There is some overlapping of the $T_z$ phonon sideband with the $T_y$ 0,0-band, although it appears that this will not seriously affect the measurement in the low temperature region. The problem becomes more serious at higher temperatures when the $T_z$ emission increases in intensity relative to the $T_y$ 0,0-band. It is probable that this overlap can be compensated for by the microprocessor 36 which would introduce an appropriate correction of the $T_y$ channel count which is calculated from the $T_z$ channel count.

As mentioned previously, the system of FIG. 2 may also be used without calibration in a feedback loop as a temperature control sensor which relies on the precision of the reading of $R_{zy}$ and not on its accuracy. The precision will be determined largely by the counting statistics. Assuming that the precision is based on counting statistics, the precision, $\delta T$, of the sensor has been estimated at various temperatures in its range using eq. [3]. These are given in the table below:

TABLE

| Estimated Precision of the Device (XS in n-hexane) | | | |
|---|---|---|---|
| T (K) | $R_{zy}$ | $N_y$ (counts) | $\delta T$ (mK) |
| 3.0 | 0.1 | $10^7$ | ±0.5 |
| 4.0 | 1.0 | $10^7$ | ±0.4 |
| 10.0 | 10.0 | $10^6$ | ±3.0 |

When radiation is optically transmitted, the transmission properties will be considerable affected by the wavelength of the radiation. It is a significant feature of the present invention that the $T_z$ and $T_y$ bands are very close to each other in wavelength. As a consequence, the optical transmission properties of the system for the two monitored bands are virtually identical.

Another advantageous feature of the present invention is the fact that both bands are monitored simultaneously. Thus, $R_{zy}$ is not affected by instability of the excitation source 16. Also, in a system wherein the excitation light passes through a liquid cryogen to the sensor material, instead of through an optical fiber, the simultaneous monitoring of the two bands will cause $R_{zy}$ to be unaffected by variations in the collection efficiency such as might arise from scattering of emitted light by bubbling of liquid cryogen.

There are a number of possible modifications and variations in the sensor material. The sensor properties can be altered either by changing the host matrix or by using a different luminescent molecule. Host matrix effects are illustrated, for example, by changing the solvent matrix of XS from n-hexane to xanthone. In xanthone, emission from two traps is observed with ZFS of 11 and 20 cm$^{-1}$ in place of emission from a single trap with ZFS of 16 cm$^{-1}$. The optimal temperature range of the 20 cm$^{-1}$ trap will lie above that of XS in n-hexane, and that of the 11 cm$^{-1}$ trap will be below it. Xanthone would be a convenient matrix, being solid at room temperature, in contrast with n-hexane, which is liquid.

Control of the ZFS may also be affected by using a different molecular structure for the sensor material. Other thioketones may be used. Pyranthione and dimethylpyranthione, when dissolved in alkane matrices, have respective ZFS parameters, D, of $-24$ cm$^{-1}$ and $-28$ cm$^{-1}$. Preliminary investigations suggest these molecules have a very rapid SLR and indicate that they may be useful for liminescence thermometry above 10K. Likewise, a selenone, selenofenchone, has a large, optically resolvable ZFS.

Thiofluorenone has a smaller ZFS than XS when dissolved in n-heptane ($\sim 8$ cm$^{-1}$), but thus far this splitting has not been resolved optically. It may be useful as a sensor below 3K, but more measurements are needed to verify that thiofluorenone in a suitable matrix has all the required properties of the sensor system.

The sensor molecules and/or the host matrix also may be modified by isotopic substitution which may induce changes in the dynamic properties of the excited states. XS has a radiative phosphorescence quantum yield of only 0.1; 90% of the excited states decay by radiationless processes. Substitution of H with D in aromatic hydrocarbons and azaromatic molecules is known to reduce the efficiency of radiationless decay processes and thereby increase radiative phosphorescence quantum yields and lengthen the lifetime of the triplet state. Deuteration of the host matrix frequently has similar effects. Deuteration of XS, other sensor molecules, and of host matrices will be possible modifications of this invention.

If the radiationless decay processes are significantly reduced in XS and in other sensor systems, this will improve the invention in several ways. First, SLR is not expected to be significantly affected by deuteration, but the decay constants $k_x$, $k_y$, and $k_z$ may well be decreased, possibly up to an order of magnitude. Under these conditions, the decay processes will have a smaller effect on the thermal equilibrium population distribution given by eq. [1].Secondly, increased quantum yields will produce higher counting rates and better precision for a given incident optical pumping intensity. Thirdly, smaller radiationless decay constants will reduce the fraction of absorbed light energy which is degraded to heating of the sensor. This possible source of error will be reduced further.

All the luminescent sensor states thus far investigated are triplet states, but the principles of operation of the luminescence thermometer do not restrict the emission to phosphorescence from a triplet state. Other possible modifications involve the use of sensor materials which emit light from states of higher multiplicity which may have properties stated previously as (a)–(e). These may be luminescent sensors containing metals, for example.

The present invention has a number of advantages over the existing practice. Because of the fiberoptic and sensor arrangement, as in FIG. 2, the present system has the flexibility associated with resistance thermometry, but also has some important advantages. Resistance thermometers cannot be constructed with accurately predetermined properties. Thus, for accurate measurement, each unit must be individually calibrated. Temperature measurement using the sensors described in this invention is based on the photophysical and thermodynamic properties of a well-defined system—a dilute solution of a chemically pure well-defined compound in a pure, well-defined matrix. Sensors with identical properties can thus be produced easily, given the pure compounds, which are inexpensive in the quantities required. Thus, unlike resistance thermometers, no individual sensor calibration is required. In this sense, molecular luminescence thermometry is analogous to helium vapor pressure thermometry, which is based on thermodynamic properties of the pure sensor material; a single calibration is used for all individual sensors. Luminescence sensors are useful over a wider temperature range than helium, although they have a lower limit above that of helium. Measurements are less tedious, and the apparatus is less cumbersome than is required for accurate helium vapor pressure measurement. The use of photon counting provides greater precision and potentially greater accuracy than currently is available using resistance thermometers.

Calibrated carbon glass resistors and silicon diodes have an estimated accuracy of ±5 mK below 20K, while the accuracy of a Ge resistor in this range is claimed to be ±2 mK. The cost of calibrating such a sensor in the range 2-20K currently is over $600, and the sensor itself costs between $100 and $200. If a sensor is damaged, the replacement cost may exceed $800, as well as the time required to obtain a replacement calibrated sensor. On the other hand, no effective loss accompanies the demise of a particular sensor for molecular luminescence thermometry.

Resistance thermometers frequently are subject to errors due to internal heating by the current they are required to carry for the mesurement. In contrast, the energy dissipation as heat in the molecular luminescence sensor is orders of magnitude less, and this source of error can be effectively avoided. Another feature of resistance thermometers is that a careless operator can easily exceed the current carrying limit of a sensor and damage it permanently with the corresponding loss of calibration accuracy. The nature of the molecular luminescence sensor makes any type of damage, loss, or destruction relatively inconsequential.

It is important to point out that the single calibration feature of the sensors of molecular luminescence thermometers does not rely on the validity of eq. [3] for computation of temperature. A calibration curve for a particular sensor system can be produced by calibration against existing standards at the National Bureau of Standards using a device with measured $c_z/c_y$. This calibration can then be used for the same sensor formulation by merely factoring in the instrument parameter, $c_z/c_y$, of the particular sensor system.

The foregoing description of the preferred embodiment has been presented for purposes of illustration and description. It is not intended to be exhaustive or to limit the invention to the precise forms described, and obviously many modifications and variations are possible in light of the above teaching. The embodiment was chosen and described in order to best explain the principles of the invention and its practical applications to thereby enable others in the art to best utilize the invention in various embodiments and with various modifications as are suited to the particular use contemplated. It is intended that the scope of the invention be defined by the claims appended hereto.

What is claimed is:

1. A method of measuring a cryogenic temperature of an environment, the method comprising:
   placing a sensor material in said environment and allowing said sensor material to have its temperature be the same as said cryogenic temperature, said sensor material having an excited multiplet state which has a higher energy sublevel state and a lower energy sublevel state, said sensor material having a capability of emitting radiant emissions in the visible or near infrared spectral region from both of the sublevel states when said sensor material is excited, said sublevel states being split by an energy separation in the absence of electric or magnetic fields (zero field splitting), and said zero field splitting being sufficiently great that the radiant emissions from said sublevel states are optically resolvable from each other, the radiant emissions from said sublevel states each having a degree of intensity,
   exciting said sensor material to cause both of said sublevel states of said multiplet state to emit radiant emission,
   detecting separately the degree of intensity of the radiant emissions from said sublevel states,
   determining a relationship between the detected degrees of intensity of the radiant emissions from said sublevel states, and
   determining the temperature of said sensor material from said relationship between the detected degrees of radiant emissions from said sublevel states.

2. A method as set forth in claim 1, wherein said sublevel states of said multiplet state have spin-lattice relaxation rates therebetween and have decay rates to other energy levels and wherein the spin-lattice relaxation rates between said sublevel states of said multiplet state are very much larger than their decay rates to other energy levels so that deviations of populations of the sublevel states from thermal equilibrium are not significant.

3. A method as set forth in claim 1, wherein said sensor material is dissolved in a host material which provides phosphorescence emission line widths which are narrower than the zero field splitting of the sublevel states of said multiplet state of said sensor material.

4. A method as set forth in claim 3, wherein said sublevel states of said multiplet state have spin lattice relaxation rates therebetween and have decay rates to other energy levels and wherein the spin-lattice relaxation rates between said sublevel states of said multiplet state are very much larger than their decay rates to other energy levels so that deviations of populations of the sublevel states from thermal equilibrium are not significant.

5. A method as set forth in claim 1, wherein said sensor material is a thioketone or a selenone.

6. A method as set forth in claim 1, wherein said sensor material is xanthione in a host material and wherein said host material is n-hexane or xanthone.

7. A method as set forth in claim 1, wherein the temperature of said sensor material is determined from the equation $$T = (E_{zy}/R)[\ln(c_z k_z^r / c_y k_y^r) - \ln R_{zy}]^{-1}$$

wherein:
   $T$ = the temperature of the sensor material,
   $E_{zy}$ = the difference between the energies of said sublevel states,
   $R$ = gas constant,
   $c_z$ = the constant of efficiency of collection of emission from the higher energy sublevel state,
   $c_y$ = the constant of efficiency of collection of emission from the lower energy sublevel state,
   $k_z^r$ = the radiative rate constant for emission from the higher energy sublevel state,
   $k_y^r$ = the radiative rate constant for emission from the lower energy sublevel state,
   $R_{zy}$ = the relative intensity ratio of the detected degrees of radiant emissions from said sublevel states.

8. A method as set forth in claim 1, wherein the degree of intensity of radiant emission detected separately from each of said sublevel states is detected by receiving photons emitted from each of said sublevel states and by counting the number of photons received from one of said sublevel states in the same length of time that photons received from the other of said sublevel states are counted.

9. A method as set forth in claim 1, wherein the temperature of said sensor material determined from the equation $$T=(E_{zy}/R)[\ln(c_z k_z^r/c_y k_z^r) - \ln R_{zy}]^{-1}$$

wherein:
T = the temperature of the sensor material,
$E_{zy}$ = the difference between the energies of said sublevel states,
R = gas constant,
$c_z$ = the constant of efficiency of collection of emission from the higher energy sublevel state,
$c_y$ = the constant of efficiency of collection of emission from the lower energy sublevel state,
$k_z^r$ = the radiative rate constant for emission from the higher energy sublevel state,
$k_y^r$ = the radiative rate constant for emission from the lower energy sublevel state,
$R_{zy}$ = the relative intensity ratio of the detected degrees of radiant emissions from said sublevel states.

10. A method as set forth in claim 9, wherein said sensor material is a thioketone or a selenone.

11. A method as set forth in claim 9, wherein said sensor material is xanthione in a host material and wherein said host material is n-hexane or xanthone.

12. A method of maintaining a constant cryogenic temperature of an environment, the method comprising:
placing a sensor material in said environment and allowing said sensor material to have its temperature be the same as said cryogenic temperature, said sensor material having an excited multiplet state which has a higher energy sublevel state and a lower energy sublevel state, said sensor material having a capability of emitting radiant emissions in the visible or near infrared spectral region from both of the sublevel states when said sensor material is excited, said sublevel states being split by an energy separation in the absence of electric or magnetic fields (zero field splitting), and said zero field splitting being sufficiently great that the radiant emissions from the two said sublevel states are optically resolvable from each other, the radiant emissions from said sublevel states each having a degree of intensity,
exciting said sensor material to cause both of said sublevel states of said multiplet state to emit radient emission,
detecting separately the degrees of intensity of the radiant emissions from said sublevel states,
determining a relationship between the detected degrees of intensity of the radiant emissions from said sublevel states, and
heating or cooling said environment as needed to maintain said relationship at a constant level.

13. A method as set forth in claim 12, wherein said sublevel states of said multiplet state have spin-lattice relaxation rates therebetween and have decay rates to other energy levels and wherein the spin-lattice relaxation rates between said sublevel states of said multiplet state are very much larger than their decay rates to other energy levels so that deviations of populations of the sublevel states from thermal equilibrium are not significant.

14. A method as set forth in claim 12, wherein said sensor material is dissolved in a host material which provides luminescence emission linewidths which are narrower than the zero field splitting of the sublevel states said multiplet state of said sensor material.

15. A method as set forth in claim 14, wherein said sublevel states of said multiplet state have spin-lattice relaxation rates therebetween and have decay rates to other energy levels and wherein the spin-lattice relaxation rates between said sublevel states of said multiplet state are very much larger than their decay rates to other energy levels so that deviations of populations of the sublevel states from thermal equilibrium are not significant.

16. A method as set forth in claim 12, wherein said sensor material is a thioketone or a selenone.

17. A method as set forth in claim 12, wherein said sensor material is xanthione in a host material and wherein said host material is n-hexane or xanthone.

18. A method as set forth in claim 12, wherein the degree of intensity of radiant emission detected separately from each of said sublevel states is detected by receiving photons emitted from each of said sublevel states and by counting the number of photons received from one of said sublevel states in the same length of time that photons received from the other of said sublevel states are counted.

19. Apparatus for measuring a cryogenic temperature of an environment, the method comprising:
sensor material adapted to be placed in said environment so that its temperature can be the same as said cryogenic temperature, said sensor material having an excited multiplet state which has a higher energy sublevel state and a lower energy sublevel state, said sensor material having a capability of emitting radiant emissions in the visible or near infrared spectral region from both of the sublevel states when said sensor material is excited, said sublevel states being split by an energy separation in the absence of electric or magnetic fields (zero field splitting), and said zero field splitting being sufficiently great that the radiant emissions from said sublevel states are optically resolvable from each other, the radiant emissions from said sublevel states each having a degree of intensity,
means for exciting said sensor material to cause both of said sublevel states of said multiplet state to emit radiant emission,
means for generating first and second signals proportional to the degrees of intensity of the radiant emissions from said higher energy and lower energy sublevel states, respectively,
means for calculating the temperature of said sensor material from a ratio of said first and second signals.

20. Apparatus as set forth in claim 19, wherein said sublevel states of said multiplet state have spin-lattice relaxation rates therebetween and have decay rates to other energy levels and wherein the spin-lattice relaxation rates between said sublevel states of said multiplet state are very much larger than their decay rates to other energy levels so that deviations of populations of the sublevel states from thermal equilibrium are not significant.

21. Apparatus as set forth in claim 19, wherein said sensor material is dissolved in a host material which provides luminescence emission linewidths which are narrower than the zero field splitting of the sublevel states of said multiplet state of said sensor material.

22. Apparatus as set forth in claim 21, wherein said sublevel states of said multiplet state have spin-lattice relaxation rates therebetween and have decay rates to other energy levels and wherein the spin-lattice relaxation rates between said sublevel states of said multiplet state are very much larger than their decay rates to other energy levels so that deviations of populations of the sublevel states from thermal equilibrium are not significant.

23. A method as set forth in claim 19, wherein said sensor material is a thioketone or a selenone.

24. A method as set forth in claim 19, wherein said sensor material is xanthione in a host material and wherein said host material is n-hexane or xanthone.

25. A method as set forth in claim 19, wherein the temperature of said sensor material is determined from the equation $$T=(E_{zy}/R)[\ln(c_z k_z^r/c_y k_y^r) - \ln R_{zy}]^{-1}$$

wherein:
T = the temperature of the sensor material,
$E_{zy}$ = the difference between the energies of said sublevel states,
R = gas constant,
$c_z$ = the constant of efficiency of collection of emission from the higher energy sublevel state,
$c_y$ = the constant of efficiency of collecton of emission from the lower energy sublevel state,
$k_z^r$ = the radiative rate constant for emission from the higher energy sublevel state,
$k_y^r$ = the radiative rate constant for emission from the lower energy sublevel state,
$R_{zy}$ = the relative intensity ratio of the detected degrees of radiant emissions from said sublevel states.

26. Apparatus as set forth in claim 19 wherein said means for generating said first and second signals includes means for receiving emitted photons from both of said sublevel states and for counting the number of photons received from one of said sublevel states in a given length of time and for counting the number of photons received from the other of said sublevel states in the same length of time.

27. Apparatus as set forth in claim 26, wherein said radiations from said sublevel states are at different frequencies and wherein said means for generating first and second signals includes a double peaked polarizing interference filter tuned to the frequencies of the radiant emissions of said sublevel states and operable to polarize the radiant emission of one of said sublevel states horizontally and to polarize the radiant emission of the other of said sublevel states vertically, and means for spacially separating the polarized radiant emissions.

28. Apparatus as set forth in claim 26, wherein said means for calculating the temperature of said sensor material has the function of calculating said temperature from the equation $$T=(E_{zy}/R)[\ln(c_z k_z^r/c_y k_y^r) - \ln R_{zy}]^{-1}$$

wherein:
T = the temperature of the sensor material,
$E_{zy}$ = the difference between the energies of said sublevel states,
R = gas constant, $c_z$ = the constant of efficiency of collection of emission from the higher energy sublevel state,
$c_y$ = the constant of efficiency of collection of emission from the lower energy sublevel state,
$k_z^r$ = the radiative rate constant for emission from the higher energy sublevel state,
$k_y^r$ = the radiative rate constant for emission from the lower energy sublevel state,
$R_{zy}$ = the relative intensity ratio of the detected degrees of radiant emissions from said sublevel states.

29. Apparatus as set forth in claim 28, wherein said sensor material is a thioketone or a selenone.

30. A method as set forth in claim 28, wherein said sensor material is xanthione in a host material and wherein said host material is n-hexane or xanthone.

31. Apparatus for maintaining a constant cryogenic temperature of an environment comprising:
a sensor material adapted to be placed in said environment so that its temperature can be the same as said cryogenic temperature, said sensor material having an excited multiplet state which has a higher energy sublevel state and a lower energy sublevel state, said sensor material having a capability of emitting radiant emissions in the visible or near infrared spectral region from both of the sublevel states when sand sensor material is excited, said sublevel sates being split by an energy separation in the absence of electric or magnetic fields (zero field splitting), and said zero field splitting being sufficiently great that the radiant emissions from said sublevel states are optically resolvable from each other, the radiant emissions from said sublevel states each having a degree of intensity,
means for generating first and second signals proportional to the degrees of intensity of the emitted radiations from said higher energy and lower energy sublevel states, respectively,
means for determining a ratio of said first and second signals,
means for heating or cooling said environment, and
feedback means for actuating said heating or cooling means in response to a variation of the ratio of said first and second signals from a desired value to heat or cool said environment as needed to thereby heat or cool said sensor material and cause said ratio of said first and second signals to return to said desired value.

32. Apparatus as set forth in claim 31 wherein said sublevel states of said multiplet state have spin-lattice relaxation rates therebetween and have decay rates to other energy levels and wherein the spin-lattice relaxation rates between said sublevel states of said multiplet state are very much larger than their decay rates to other energy levels so that deviations of populations of the sublevel states from thermal equilibrium are not significant.

33. Apparatus as set forth in claim 31, wherein said sensor material is dissolved in a host material which provides luminescent emission linewidths which are narrower than the zero field splitting of the sublevel states of said multiplet state of said sensor material.

34. Apparatus as set forth in claim 33, wherein said sublevel states of said multiplet state have spin-lattice relaxation rates therebetween and have decay rates to other energy levels and wherein the spin-lattice relaxation rates between said sublevel states of said multiplet state are very much larger than their decay rates to other energy levels so that deviations of populations of the sublevel states from thermal equilibrium are not significant.

35. A method as set forth in claim 34, wherein said sensor material is xanthione in a host material and wherein said host material is n-hexane or xanthone.

36. Apparatus as set forth in claim 31, wherein said sensor material is a thioketone or a selenone.

37. Apparatus as set forth in claim 31, wherein said means for generating said first and second signals includes means for receiving emitted photons from both of sad sublevel states and for counting the number of photons received from one of said sublevel states in a given length of time and for counting the number of photons received from the other of said sublevel states in the same length of time.

38. Apparatus as set forth in claim 37, wherein said radiations from said sublevel states are at different frequencies, and wherein said means for generating first and second signals includes a double peaked polarizing interference filter tuned to the frequencies of the radiant emissions of said sublevel states and operable to polarize the radiant emission of one of said sublevel states and operable to polarize the radiant emission of the other of said sublevel states vertically, and means for spacially separating the polarized radiant emissions.

39. Apparatus as set forth in claim 38, wherein said sensor material is a thioketone or a selenone.

40. Apparatus as set forth in claim 38, wherein said sensor material is xanthione in a host material and wherein said host material is n-hexane or xanthone.

* * * * *